United States Patent [19]
Maxwell

[11] Patent Number: 5,641,036
[45] Date of Patent: Jun. 24, 1997

[54] CLIMBING TREE STAND WITH BACKPACK, CLIMBING AID AND SEAT

[76] Inventor: James Clifford Maxwell, 2560 Coles Bend Rd., Smiths Grove, Ky. 42171

[21] Appl. No.: 327,703

[22] Filed: Oct. 24, 1994

[51] Int. Cl.$^6$ ............................................. A01M 31/02
[52] U.S. Cl. ................................... 182/135; 182/187
[58] Field of Search .................................. 182/133–136, 182/187, 188

[56] References Cited

U.S. PATENT DOCUMENTS

| | | | |
|---|---|---|---|
| 4,597,473 | 7/1986 | Peek | 182/134 X |
| 5,265,780 | 11/1993 | Matthews | 182/133 X |
| 5,310,019 | 5/1994 | Paul | 182/135 X |
| 5,379,861 | 1/1995 | Amacker | 182/134 X |

OTHER PUBLICATIONS

"Shooter" by Summit Industries.

*Primary Examiner*—Alvin C. Chin-Shue
*Attorney, Agent, or Firm*—Rick Martin

[57] ABSTRACT

A hunter's tree stand is provided with a lightweight composite platform and a flexible steel truss belt encircling and engaging the supporting tree. One end of the belt and the belt length adjustment member has supporting links at opposite sides of the platform. These links are movable from an automatically locked, collapsed position to a raised and automatically locked operative position extending upwardly and forwardly from the platform. The belt and belt adjustment member are supported by pivotal attachment to respective links carrying a sliding guide slot. The guide slot receives a compression spring actuated cylinder plunger biased to engage holes at opposite of the guide length. The cylinder plunger is recessed through the platform supporting angle into the sides of the composite platform and allows lateral movement of the supporting lengths and the encircling belt, thus eliminating the need for universal joints. The belt adjustment member housing is attached to one end of a second link that is pivotally attached to the supporting platform angle at the other end. The length of the encircling belt is changed by its position relative to two engaging, single axle, independently spring actuated, cam members in the adjustment member housing. The cam members are released from engagement by removal of the platforms load and by application of tension to a handle on the operating wires.

11 Claims, 8 Drawing Sheets

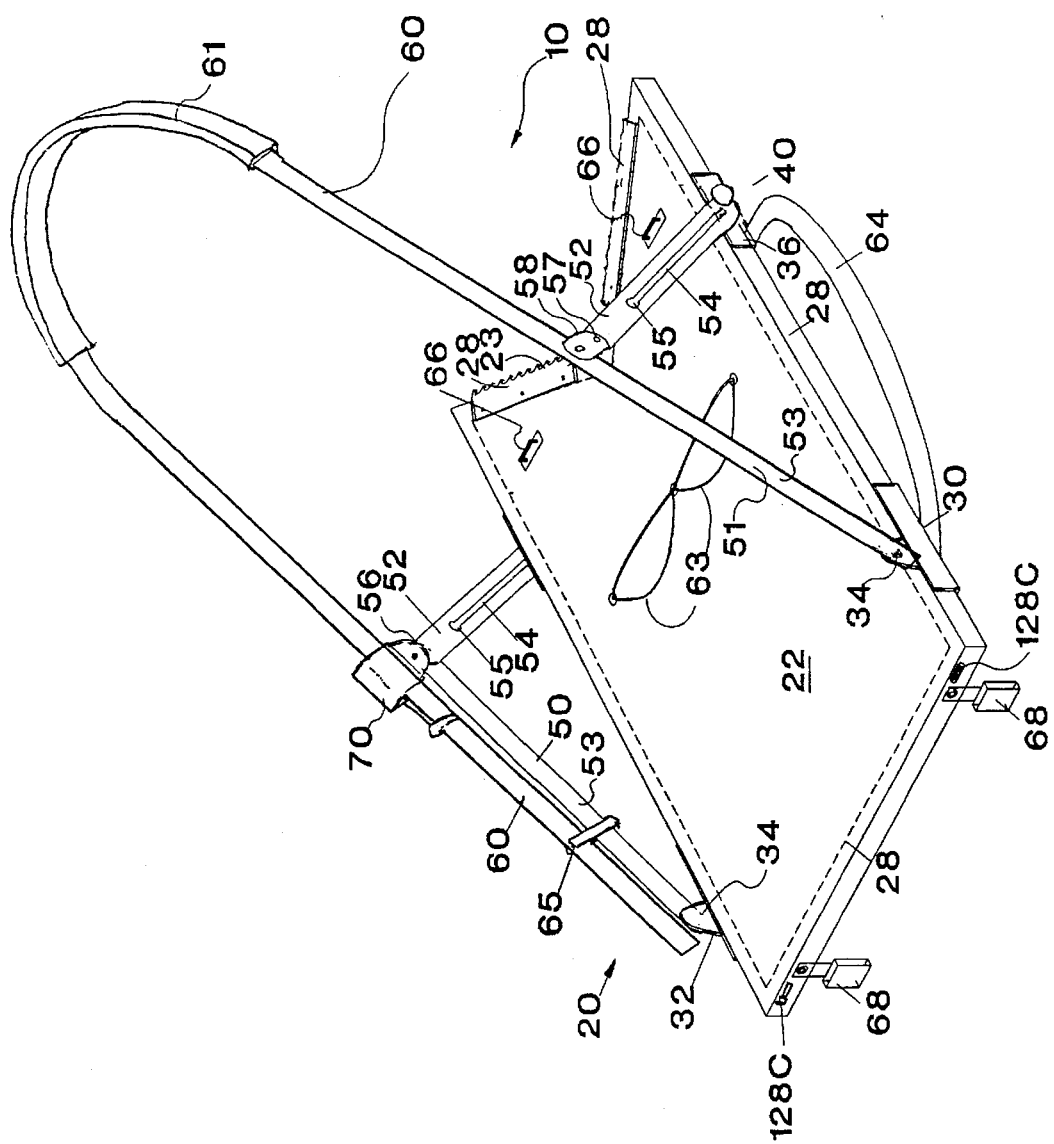

CLIMBING TREE STAND WITH BACKPACK, CLIMBING AID AND SEAT

BACKGROUND OF THE INVENTION

The present invention relates to a portable observation platform to be suspended from columnar support structures such as trees and utility poles for use by hunters, photographers, naturalists, workmen or the like who venture into mature forests carrying supplies for an extended stay and to obtain a high vantage point.

Hunters and naturalists have learned that is of particular advantage to gain a higher vantage point for their specific needs and over the last few decades have been carrying portable tree stands into the woods to do so. Such tree stands are generally of two types: 1) climbing and 2) hang-on. While some of these tree stands have straps or slings to function as an aid to travel, few are designed to carry the supplies which might be required for travel to a remote area for a multiple day stay. It is, therefore, an object of the present invention to provide a climbing tree stand that may be integrated with a backpack carriage frame and pack envelope that is lightweight and durable and quiet.

Another object of the present invention is to provide a platform supporting truss belt that is easily and infinitely adjustable.

A still further object of the invention is to provide non-incremental (or infinite) adjustment of a tree encircling truss belt relative to platform supporting link members.

Another object of the present invention is to provide convenient attachment of a tree climbing aid and seat assembly to the stand platform to facilitate hands-free carriage of the apparatus in assembly with a pack envelope.

A still further object of this invention is to provide a simple mechanism for supporting the tree encircling truss belt at a desired angle relative to the platform.

Another object of the invention is to provide a tree encircling truss belt support mechanism that folds to a compact and securely held position when required for backpack transport.

A still further objective of this invention is a design to relieve the stresses from a rigidly held supporting mechanism for the tree encircling truss belt so that the forces are more uniformly distributed and therefore safer with long term use.

Yet another objective of the invention is to provide tree climbing apparatus with an infinitely adjustable seat height relative to the platform.

Still another objective of the present invention is to provide a seat on the tree climbing aid which can be hingedly rotated out of the way when desired.

A still further objective of this invention is to provide a seat on the tree climbing aid which can be used in either of two modes: (1) facing the supporting upright column (tree), or (2) facing away the column with the user's back as close as possible to the column.

SUMMARY OF THE INVENTION

These objects of the invention are accomplished by the preferred embodiment thereof which provides a honeycomb composite panel with continuously bonded top and bottom skins integrated with a bonded perimeter insert as a platform of increased unit strength, structural attachment area, a means of incorporating part of the operating apparatus into the thickness of the panel, protection of the edge from compression and puncture, a means of attaching accessories without damaging the panel, and a means of incorporating a notch providing a bearing surface which contacts the supporting column member.

Another important feature of this invention is the encircling flexible steel truss belt which engages the supporting tree or pole which shall hereafter be characterized as a vertical support column. One side of the belt and the belt adjustment member have supporting links at opposite sides of the platform that are moveable from an automatically locked, collapsed position to a raised and automatically locked, operative position which extends upwardly from the platform edge and toward the column. The belt and belt adjustment guide housing member are supported by respective, pivotally attached and slidably interconnected links that carry a guide slot. Each guide slot receives a coil spring actuated cylinder plunger that is biased to engage holes in the respective link guide slot. The cylinder plunger is recessed through the platform supporting angle into the edges of the composite platform. The belt adjustment guide housing member is also pivotally attached to a second link that is pivotally attached at the supporting platform bracket. The belt adjustment guide receives the encircling belt with a length adjustment changed by the position of the belt relative to two engaging, single axle, independent, compression spring actuated cam members in the adjustment guide housing. The cam members are released from engagement with the encircling belt by removal of the platform load and by application of tension to operating wires which counter rotate the cams away from the encircling band.

This invention provides a lightweight, combination climbing tree stand wherein the individual may use the invention for sitting in the tree at a fully adjustable height, seated either facing the tree or facing away, at one's choice, standing in a tree, as well as an aid for climbing the tree, all without damaging the tree.

The backpack frame and tree stand of the invention consist of three components: 1) a flexible truss belt supported platform; 2) a rigid, tree encircling climbing aid with an adjustable seat; and, 3) a backpack envelope. The support platform includes clips and cleats to attach a fabric pack envelope which serves to hold miscellaneous items necessary to the outdoorsman. The climbing aid consists of a two point, tree contacting area on the center of an H-shaped frame member. An arch shaped back member which is adjusted by positioning two bolt fasteners through a pair of holes in a line series at the top of the arms of the H-frame with axially threaded tethered knobs so that upon application of a vertical load to the front legs of the H-frame, the arch shaped member engagingly embraces the vertical column member.

Climbing can be accomplished by either of two procedures, both requiring attaching platform stirrups to one's feet. By one procedure, the seat is removed from the H-frame legs and the climber supports himself on the H-frame legs under his forearms and elbows while rotating and lifting the platform with one's legs to a comfortable height advance then rotating the platform in an opposite direction to a fully engaged position.

Alternatively, climbing can be accomplished by placing the seat of the climbing aid to the outboard position, sitting on it and then pulling the platform attached to the feet to a higher position and rotatingly engaging the tree.

BRIEF DESCRIPTION OF THE DRAWINGS

The foregoing characteristics, features and objectives of the present invention will become more apparent by reference to the following description and accompanying drawings wherein:

FIG. 2 is a pictorial view of the platform assembly of the invention.

DESCRIPTION OF THE PREFERRED EMBODIMENTS

Figure 1:
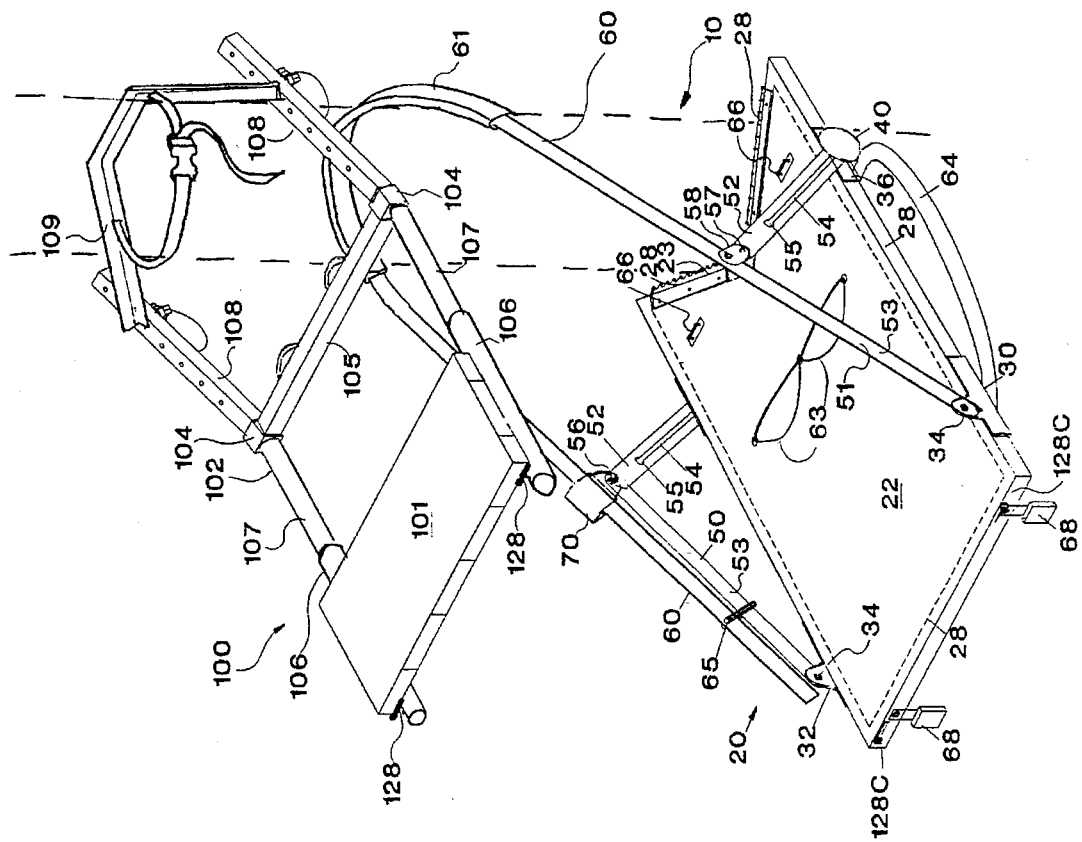
FIG. 1 is a pictorial view of the invention platform and seat assembly in the outboard operative use position.
Figure 4:
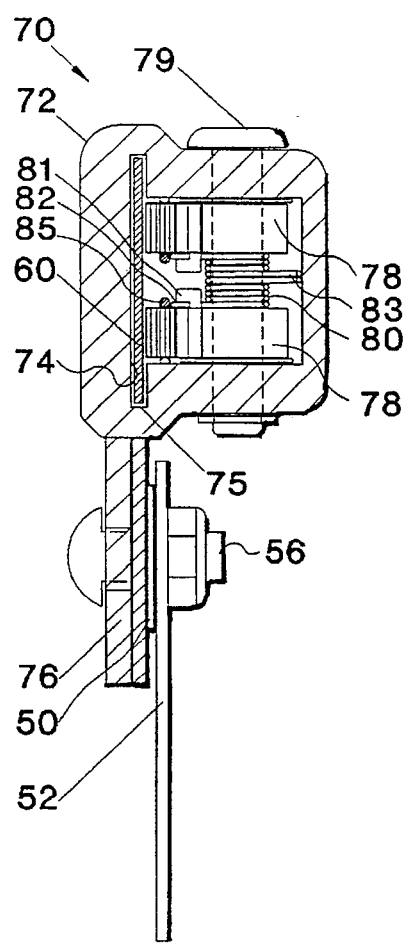
FIG. 4 is a transverse sectional view of the invention buckle.
Figure 3:
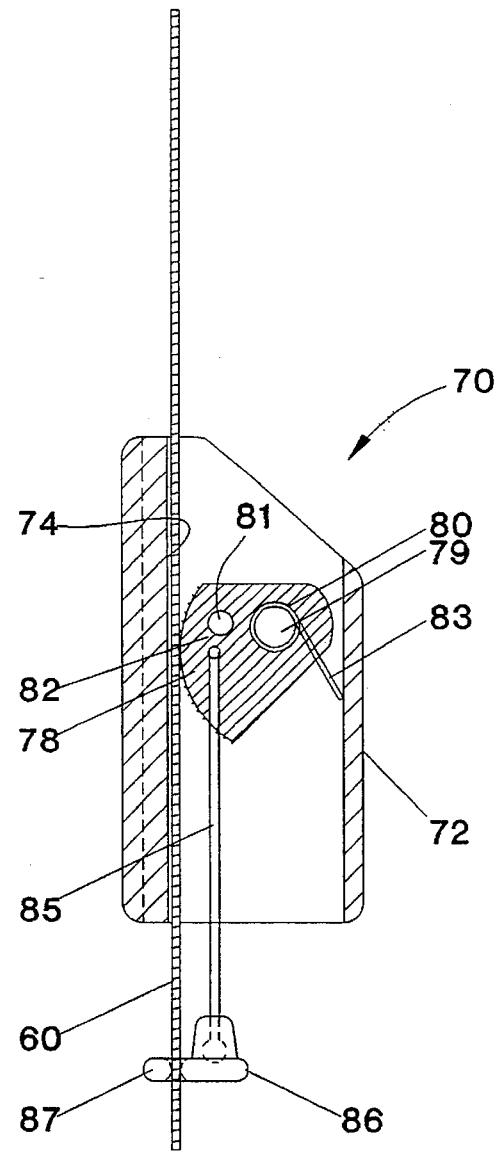
FIG. 3 is longitudinal sectioned view of the invention buckle.

Relative to the drawings wherein like reference characters designate like or similar elements throughout the several figures of the drawings, FIG. 1 shows the present invention in the deployed state supported by a vertical column 10 which may be a tree or utility pole, for example. Secured to the column 10 are two primary support structures comprising a platform unit 20 and a seat unit 100.

Figure 8:
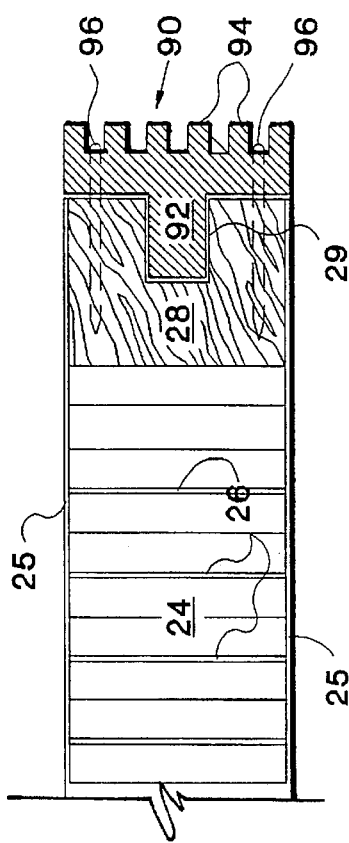
FIG. 8 is a section view of the invention platform edge.
Figure 9:
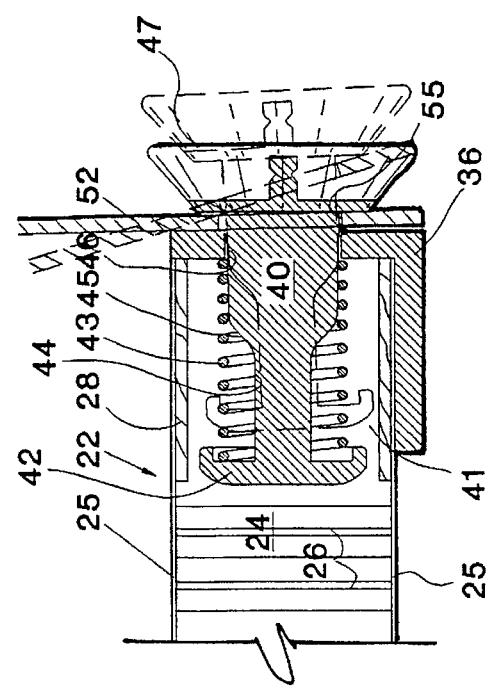
FIG. 9 is a transverse sectional view of the invention link pin.

The platform 22 is a trapezoid of suitable dimension having a notch or saddle along one edge to embrace the column surface. This platform plate is of composite construction having an interior honeycomb plate such as the ACG product of Hexcel, Graham, Tex., which uses 3,000 series aluminum alloy foil that is approximately 3 mils thick. The honeycomb cells are approximately ⅜ in. across with a density property of approximately 3.6 lbs. per cubic foot. A preferred honeycomb plate thickness is about 1 in., such thickness corresponding to the honeycomb cell length as is illustrated by FIGS. 8 and 9 showing the cell walls 26 of the cell plate 24.

A perimeter band 28 of substantially solid material such as wood, steel, aluminum, fiberglass or other composite surrounds the entire perimeter of the honeycomb plate 24. Thin fiberglass or aluminum skin sheets 25 are bonded to the upper and lower faces of both the honeycomb plate 24 and the perimeter band 28 to integrate the elements as a singular structural unit.

As a primary functional purpose, perimeter band 28 serves as an edge bumper for the honeycomb plate and a mechanical fastener attachment base.

Figure 5:
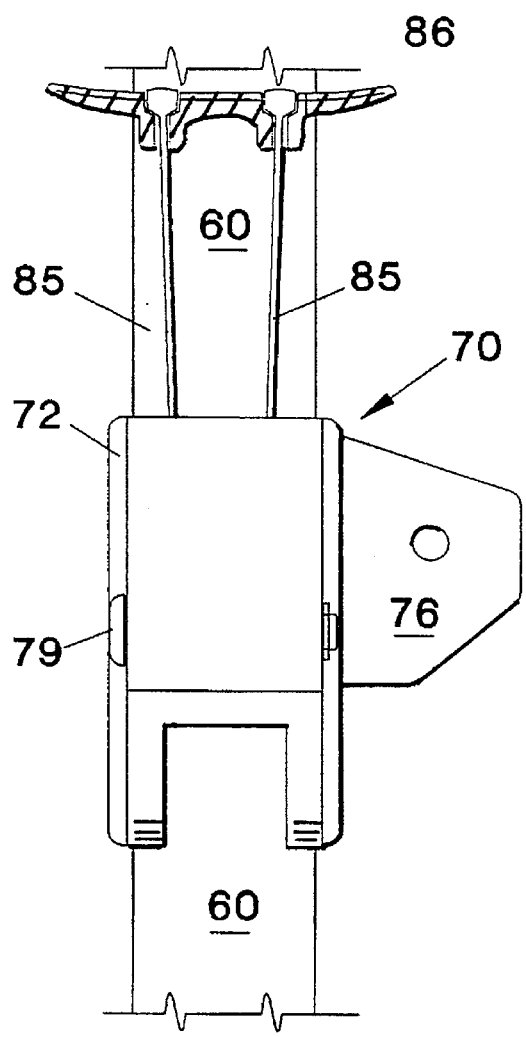
FIG. 5 is a plan view of the truss belt adjustment buckle.

Along the notch or saddle edge 23 of the platform 22, the perimeter band 28 is provided with an elongated channel 29 as shown in FIG. 5. The channel 29 is sized to receive a elongated tab element 92 of an elastomer extrusion 90 for cladding the edge face of the perimeter band 28. Staples 96 into the perimeter band 28 secure a resilient elastomer extrusion in place. Extruded face treads 94 contribute to an increased frictional coefficient between the platform 22 and the surface of column 10.

Additional protection from vertical slippage is provided by two pieces of toothed steel, mechanically attached at the platform notch 23 for biting in to the supporting upright 10. These pieces are bent at an approximately 28 degree angle to assist in mild penetration into the bark of the supporting upright 10.

Angle brackets 32 and 30 secured to the perimeter 28 near the front edge of the platform 22 are provided with pivot pins 34 that rotatably support, respectively, the front distal end of independent link 50 and the front dependent link 51. The dependent link 51 may be an integral extension of truss belt 60 but between the front pivots 34 and center pivot joint 57 functions as a link joint. Front links 50 and 51 are preferably stiffened against lateral flexure by formed ribs 53.

Rear links 52 are substantially identical on both sides of the platform. Each have a pair of formed ribs on either side of and parallel to the elongated slot 54 which opens at both ends into an enlarged diameter aperture socket 55. A depending bracket 58, also with formed ribs, is secured to the truss belt 60 supporting the center pivot point 57 for one of the rear slotted links 52 at an offset position which allows the slotted link 52 to nest parallel along the platform edge 28 when the trust belt 60 is rotated parallel with the plane of the platform 22. The same link nesting result is accomplished by depending pivot bracket 76 from the truss belt buckle housing 72 to join the independent front link 50 with the rear slotted link 52 at the center pivot joint 56.

The rear distal ends of slotted links 52 are secured to the platform edge 28 by means of angle brackets 36. With respect to FIG. 9, the perimeter band 28 is provided with a pocket recess 41 to receive the length of a spring biased pivot pin 40. At the interior end of the pin 40 is a spring base 42 which seats one end of a coil spring 43. The other end of the coil spring 43 seats against the edge leg of the bracket 36. The outer distal end of the pin 40 has a terminal knob 47 which has a larger sectional area than the socket 55 in the slotted link 52. Between the spring base 42 and the terminal knob 47 the pivot pin 40 has a small diameter pin segment 44 which is slightly smaller than the width of the guide slot 54. A larger diameter pin segment 46 is slightly smaller than the socket 55 and an angled transitional segment 45 smoothly connects the larger and smaller diameters.

Figure 6:
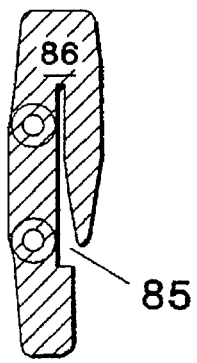
FIG. 6 is a sectional view of the buckle cam release handle.

As will be noted from the phantom line portion of FIG. 6, this spring biased pivot pin confines the slotted link 52 at either of the selected sockets 55. Simultaneously, the plane of that confinement is compliant and permits the slotted link to be flexed and rotated laterally in relation to the platform edges.

Nesting of the supporting link assembly is accomplished by grasping the terminal knobs 47 and extracting the pin 40 against the bias of spring 43 to align the smaller diameter 44 of the pin in the plane of the slotted links 50 and 52 to permit longitudinal movement of the links 50 and 52 along the slot 54 from one socket 55 to the other.

It will be noted from FIGS. 1 and 2 that the dependent front link 51 is an integral extension of the truss belt 60. Although the pivot bracket 58 is shown to be pinned or riveted to the belt 60, it will be understood that such mechanical fastening to require the puncture of the belt 60 is not necessarily required. Specifically, band clamping could accomplish the same result. More importantly, is to be noted that the truss belt 60 is, after the bracket 58, continuous and unpenetrated. This continuity is made possible by the friction clamp or buckle 70 on the other side of the platform 22.

With respect to FIGS. 3, 4, 5 and 6, the buckle 70 is assembled within a housing 72 having a base plate 74. Laterally along a base plate is a guide channel 75 which confines the truss belt 60 therewithin. Above the base plate 74 is a cam journal pin 79 aligned parallel with the belt width and transverse to the belt length. Cams 78 are rotatable about the cam journal pin 79. Such cam rotation is resiliently biased by spring 80 that seats with a hook 82 around roll pins 81 set in the cams 78. A spring retainer leg 83 secures the other end of the spring against the buckle housing 72. Cam release wires 85 for each of the cams 78 are hooked into the cam bodies at one end of the wires. The opposite end of the release wires 85 is secured to a release handle 86. By means of a guide slot 87 the release handle 86 is positionally confined at option to the belt 60.

This friction buckle structure 70 will be understood to permit easy and infinite adjustment of the belt 60 relative to the buckle. The belt length around the support column 10 may be shortened by merely pushing the belt into the buckle. Release of the belt from the buckle is accomplished merely by pulling the release handle 86 which rotates the cam 78 away from the belt surface. The truss belt 60 fabrication material is preferably a length of high carbon steel. To the bight section of the belt, which contacts the support column 10, an extruded elastomer friction cover 61 is provided to improve the position holding forces. To ensure against belt slippage axially along the column 10, a clinch belt 62 secured to or wrapped around the belt 60 is provided to fully encircle the column 10.

Figure 7:
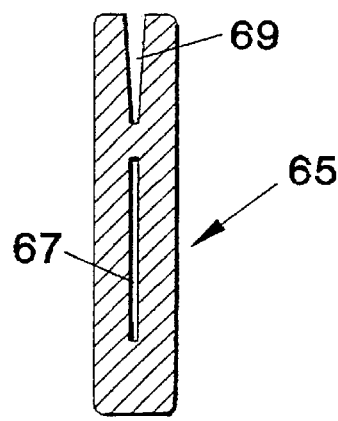
FIG. 7 is a sectional view of the truss belt retainer.

A slotted elastomer motion retainer 65 shown by FIG. 7 is attached to the independent link joint 50 by an encompassing slot 67, receives the free end of the belt 60 in a retaining notch 69 below the buckle 70 to restrict unrestrained movement of the belt end and the consequential noise that may result therefrom.

Figure 13:
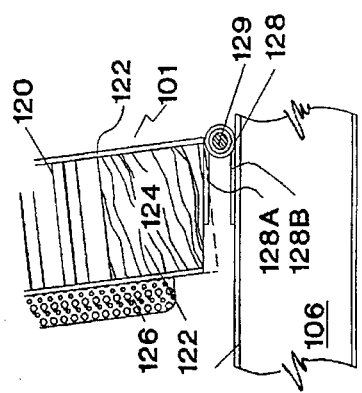
FIG. 13 is a sectional view of the H-frame seat attachment and hinge assembly with the seat in the raised position.

To facilitate attachment of a backpack envelope 140 (see FIG. 13). Cleats 66 are attached to the top surface of the platform 22 and clips 68 are attached to the front end perimeter band 28.

As a further safety measure the top surface of the platform 22 may be covered by or receive strips of a non-slip tread material such as an adhesive backed vinyl having powdered silicon carbide bonded to the free side of the vinyl.

Stirrups 63 are preferably elastomer straps or nylon webbing with cinch clips at either side under which the user slips his feet in order to facilitate the platform 22 lifting function when using the platform in the column climbing mode.

With respect to the seat unit 100 shown by FIGS. 10 through 14, an H-frame 102 comprises a pair of arms 107 for embracing the support column and a pair of legs 108 for supporting a seat board 101. The arms and legs of the H-frame are tied together with a crossbar 105. The arms 107, legs 108 and crossbar 105 of the H-frame are unitized by junction hubs 104 illustrated by FIG. 12. Arms 107 are preferably square section aluminum extrusions which socket upon the hub pin 114. Similarly, crossbar 105 is a square section aluminum extrusion that sockets upon the pin 115 of the hub 104. Legs 108, however, are carbon-epoxy circular section tubes that socket upon the cylindrical pin 116 of hub 104. Preferably, the H-frame arms, legs and crossbar are secured to the junction hubs 104 by an epoxy adhesive. However, other adhesives may be used as well as mechanical fasteners or welding.

The hub 104 and its associated pins preferably is a single, integral aluminum casting. However, machining and forging manufacturing methods may also be used.

Figure 10:
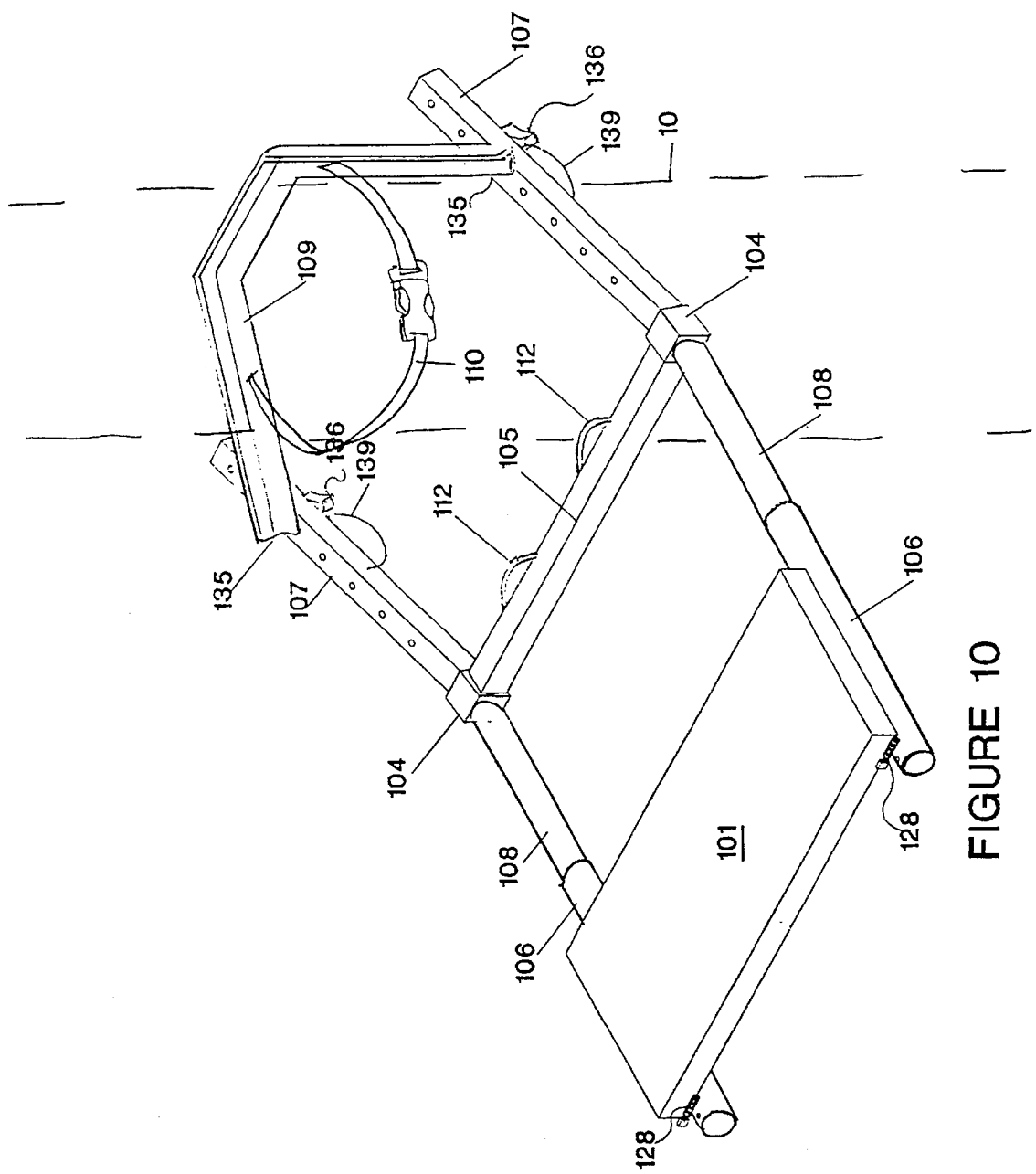
FIG. 10 is a pictorial view of the invention H-frame climbing aid and seat assembly in the outboard position.

It will be noted from FIG. 10 that the arms and legs on respective ends of the crossbar 105 are aligned in a substantially common vertical plane. The transverse plane common to both arms 107 is not, however, coincident with the transverse plane common to both legs 108. The transverse plane of the arms 107 is rotated about the axis of the crossbar 105 from the transverse plane of the legs 108 by about 25 to 30 degrees of arc.

Figure 14:
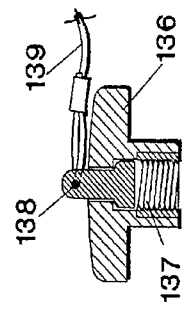
FIG. 14 is a sectional view of the threaded knob assembly.

Completing an embrace of the vertical support column 10 by the H-frame arms 107 is a segmented arch 109. This arch 109 may be fabricated from mitered and welded sections of aluminum angle stock. At respective ends of the arch 109, "north" bolts 135 are press seated at a span distance corresponding to that between apertures 133 in respective arms 107. The arch 109 is selectively positioned out the length of an H-frame arm 107 to correspond with a particular vertical support column diameter. The north bolts 135 are threaded through appropriate arm apertures 133 and secured by the knob nut 136 as best shown by FIG. 14. A threaded insert or nut 137 is molded into a vinyl or polymer knob shape 136. At the knob center is an axial aperture penetrated by an axially rotatable lanyard anchor pin 138. A lanyard 139 secured to the pin 138 at one end is secured to the H-frame arm 107 at the other end thereof.

As a means of preventing accidental downward motion of the tree seat/climber, a buckled safety belt 110 is secured to the arch 109 and around the vertical support column 10.

A pair of spaced, semi-circular pressure knees 112 serve to stabilize the H-frame from rocking about a horizontal axis.

Like the primary platform 22, the seat 101 is a fabricated composite of honeycomb plate 120 bounded by a solid material perimeter band 24 and integrated by top and bottom skin sheets 122 bonded thereto. A seat pad 126 of closed cell foam adhesively secured to the upper skin sheet 122 provides warmth and comfort to the seat surface as illustrated by FIG. 13.

Use of the present invention begins with circlement of the selected tree or pole 10 by the truss belt 60 and securing the belt end within the buckle 70 with the platform 22 plane approximately 90° to the tree axis.

Above the tree surface contact point by the truss belt, the climbing aid 100 is secured with the arch 109 embracing the tree. The arch 109 is adjusted to engage the tree surface by the arch bight section and the two stabilizing knees while the H-frame legs 108 are approximately horizontal.

In this disposition, the seat 101 may be removed and conveniently suspended from the platform 22 while the climbing process proceeds or oriented on the leg 108 to position the seat close against the crossbar 105 leaving the distal ends of the legs 108 projecting beyond the sleeve 106 length thereby providing an elbow support structure for the user's body weight.

So disposed, the user inserts his feet into the stirrups 63 while facing the supporting tree. With his weight on his elbows supported by the H-frame legs 108, the user lifts his heels above his toes to rotate the platform 22 whereby the bight position of the truss belt moves away from the tree surface simultaneously with the platform notch 23.

So aligned, the user lifts his feet with the platform to a tight knee-bend and counter rotates his ankles to set the platform notch 23 and truss belt 60 into the tree surface at the higher elevation.

Now, with his weight supported by the platform 22, the H-frame 100 is rotated relative to the tree axis to separate the stabilizing knees 112 and arch 109 from the tree surface and raised to a height convenient to the now erectly standing user.

This "inchworm" process is repeated to ascend the tree trunk or pole column. Descension is merely a reverse of the procedure.

By an alternative process, the user may secure the seat 101 at the inner position as before but seat himself thereon facing away from the tree and his feet inserted in the stirrups 63. So positioned, the user lifts his toes above his heels to disengage the platform 22 and truss belt 60 from the tree surface. The platform is then leg lifted to a deepknee-bend position and counterrotated.

Shifting weight to the legs and holding onto the H-fame 100 with the hands, the H-frame is rotated and raised as the user stand erect.

In the process of securing and releasing the buckle 70, it will be appreciated that the truss belt 60 may be shortened by merely pushing the belt into the entrance side of the buckle with load off the platform. The belt 60 is lengthened by pulling the release handle 86 away from the buckle to rotate the cams 78 in the release direction.

Because the platform unit 20 is supported by the tree 10 independently of the seat unit 100, either unit may be completely unloaded for convenient relative adjustment while positioned at the desired height in the supporting tree.

Figure 15:
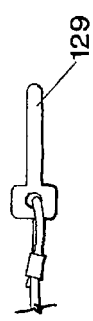
FIG. 15 is a pictorial view of the removable hinge pin for the seat unit.

Also shown by FIG. 13 is the connective hinge 128 relationship between the seat 101 and telescoping sleeves 106. Hinge plate 128A is bonded to the seat element 101 and hinge plate 128B is bonded to the telescoping sleeve 106 with the two hinged plates being separable upon removal of the hinge pin 129. Hinge pin 129 is illustrated by FIG. 15.

Seat 101 is of such length as to span the distance between the H-frame legs 108 so that telescoping sleeves 106 may be hingedly connected to the seat ends. As a feature of the invention seen from FIG. 13, angular relief is given to the perimeter band 124 so that when the seat is folded up it will carry the center of gravity of the seat past the vertical plane through the hinge axis thereby giving the raised seat gravitational stability in the raised position.

Another feature of the present invention is the placement of the seat hinges 128 near one end of the telescoping sleeves 106, such sleeves being longer than the width of the seat 101. This relationship permits the seat to be placed in either of two possible positions relative to the crossbar 105. When the sleeves 106b are telescoped over the legs 108 with the hinges 128 most proximate of the crossbar 105, the seat is best positioned for the hunter to be seated facing away from the tree. If reversed, to the arrangement illustrated by FIG. 10, with the hinges 128 most remote from the crossbar 105, the apparatus is best disposed for sitting while facing the supporting tree.

Figure 11:
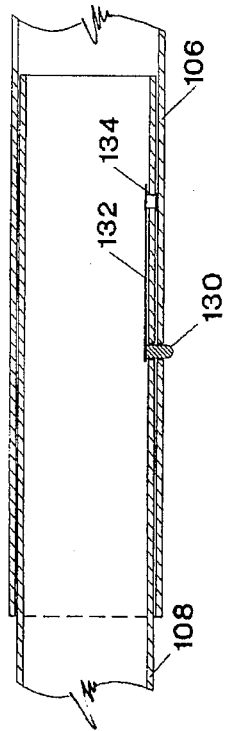
FIG. 11 is a sectional view of the telescoping seat retainer.
Figure 12:
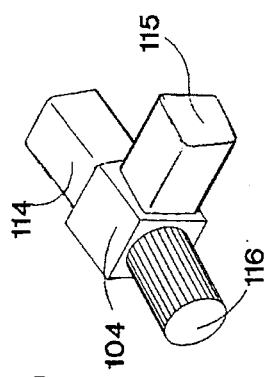
FIG. 12 is a pictorial view of the H-frame socket hub.

In either case, the seat supporting sleeves 106 are secured to the carbon epoxy legs 108 by detent pin latch illustrated by FIG. 11. There is seen a detent pin 130 secured to one end of a leaf spring 132. The other end of the leaf spring 132 is secured to a carbon-epoxy tube wall 108 by rivet 134. The detent pin 130 penetrates an aperture in the wall 108 with sufficient length to also penetrate a selected aperture in the sleeve 106 thereby preventing undesired axial displacement between the tube 108 and the sleeve 106.

Figure 16:
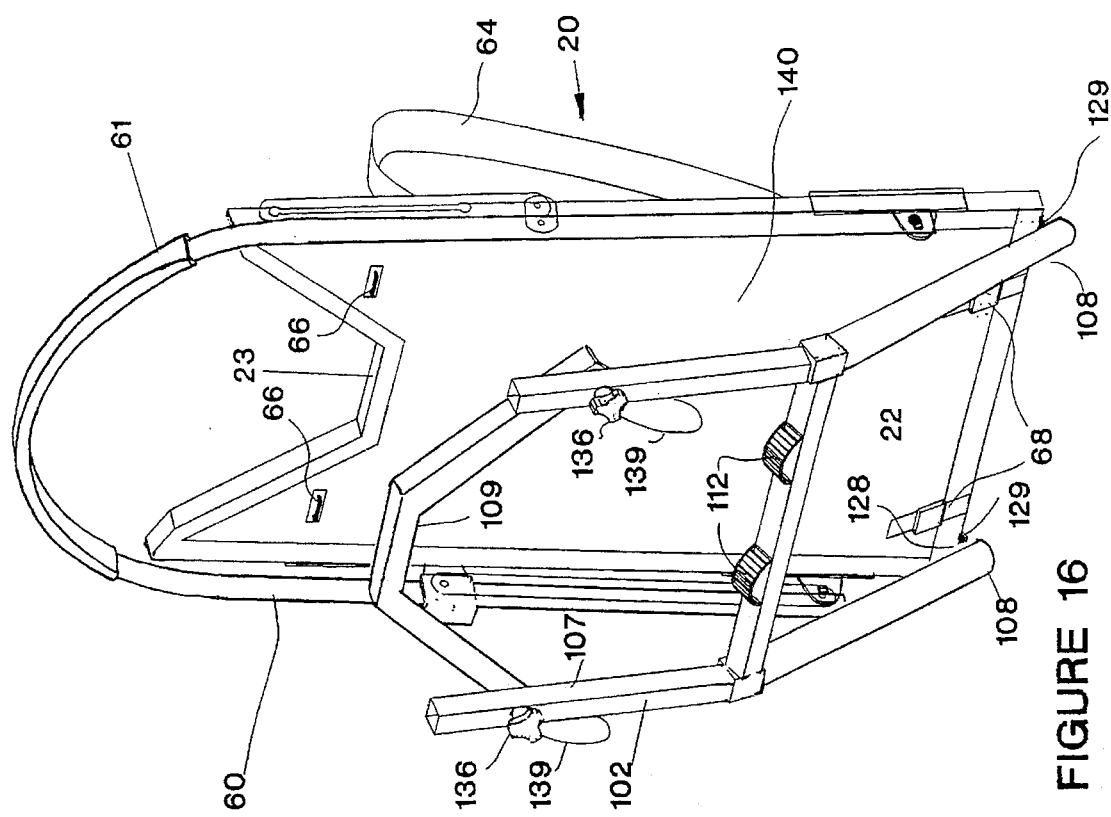
FIG. 16 is a pictorial view of the assembled backpack unit.

In the transport mode of the present invention illustrated by FIG. 16 it is seen that the truss belt 60 is folded about the front pivot joint 34 into close, parallel alignment with the platform 22. This positionment requires the spring bias pivot pin 40 to be seated in the slotted link 52 (FIG. 9) pin socket 55 most proximate of the center pivot joint 57.

With the seat platform 101 removed from the H-frame 102, the leg 106 hinge plates 128B are matched with the hinge plates 128C of the platform 22 and joined with the removable hinge pin 129. The H-frame planar angle between the plane of arms 107 and legs 106 provides a channel of space between the upper surface of platform 22 and the plane of H-frame arms 107 to receive a fabric backpack envelope that is further secured to the platform 22 by means of the cleats 66 and the clips 68. A detachable tether, not shown, secures the free end of the H-frame. Such a tether may be attached for example between the bite of the arch 109 and the notch 23 of the platform. Alternatively, the H-frame anchor arc 109 may be secured directly to the backpack envelope by flaps or lanyards.

The shoulder slings 64 shown as secured to the underside of the platform 22 are merely representative of more complex backpack frame support and control appliances such as hip belts and harnesses. It is to be understood that the platform 22 is to be managed as a rigid backpack frame with any desired system of slings, belts and paddings to be applied to the platform underside.

Having fully disclosed a preferred embodiment of my invention, it is to be understood that many subcombinations and elements described herewith are used by way of convenience and are not to be interpreted as critically limiting to the scope of my invention as set forth in the objects hereof and the following claims.

I claim:

1. A combined backpack frame and climbing wildlife stand enabling a user to employ said combination to climb a selected one of a tree and a pole, said combination having a plurality of utilization modes including a backpack mode, a climbing mode, and a wildlife stand mode, said combination comprising:

a platform unit means to provide a backpack frame in said backpack mode, a climbing device in said climbing mode, and a platform in said stand mode;

a seat unit means detachably connected to said platform unit means to encircle said selected one of a tree and a pole to assist said platform unit means in climbing said selected one of a tree and a pole when in said climbing mode and to provide a seat and a safety rail in said stand mode;

said platform unit means having a belt means to encircle said selected one of a tree and a pole to provide a climbing device to assist said seat unit means in climbing and to provide a platform in said stand mode;

said belt means to encircle further comprising a first end and a second end threaded through a friction clamp mounted on a link to said platform unit;

said platform unit further comprising a notch edge to engage said selected one of a tree and a pole;

said belt means and said link further comprising a collapsed mode to form a planar array, thereby providing said backpack frame; and said seat unit means further comprising an H frame having legs, an anchor arch and a crossbar to engage said selected one of a tree and a pole, and telescoping arms supporting a seat proximate to said selected one of a tree and a pole.

2. The combination of claim 1, wherein said telescoping arms further comprise a reversible position to enable the seat to be distal to said selected one of a tree and a pole.

3. The combination of claim 1, wherein said seat further comprises a hinge to enable said seat to tilt up forming a rail, thereby allowing a user to stand on said platform unit means in platform mode protected by said seat and said telescoping arms.

4. The combination of claim 1, wherein said link further comprises a pivot pin linkage to said platform unit, said pivot pin linkage further comprises a handle and a spring loaded engagement with said link to enable a rapid collapsing of the link to form said backpack mode.

5. The combination of claim 1, wherein said platform unit means further comprises shoulder straps and cleats for securing a backpack envelope.

6. The combination of claim 1, wherein said platform unit means further comprises an interior plate portion of honeycomb cell expanded material.

7. The combination of claim 1, wherein said seat unit means and said platform unit means each have a safety clinch belt employable during the stand mode.

8. The combination of claim 1, wherein said platform unit means further comprises
a stirrup to engage a user's feet in the climbing mode.

9. The combination of claim 1, wherein said friction clamp further comprises a cam having a release handle.

10. The combination of claim 1, wherein said first end comprises a fixed attachment to the platform unit.

11. The combination of claim 1, wherein the seat unit means detachably connected to said platform unit means further comprises:
said platform unit means further comprises a first hinge plate;
said seat unit means further comprise a second hinge plate; and
a removable hinge pin placed in an operational manner down a longitudinal axis of each of the first and second hinge plates when they are placed in an operational alignment to each other.

* * * * *